United States Patent [19]

Springer

[11] 4,131,839
[45] Dec. 26, 1978

[54] SYSTEM FOR MULTISTATION REMOTE POSITION INDICATION AND CONTROL

[76] Inventor: Barry R. Springer, 10301 Margarita Ave., Fountain Valley, Calif. 92708

[21] Appl. No.: 826,227

[22] Filed: Aug. 19, 1977

[51] Int. Cl.$^2$ .............................................. G05B 11/01
[52] U.S. Cl. .................................... 318/675; 318/562; 340/169; 343/766
[58] Field of Search ................ 343/766; 318/562, 673, 318/675, 663; 340/169

[56] References Cited

U.S. PATENT DOCUMENTS

| 3,043,998 | 7/1962 | Lunn et al. | 318/663 |
| 3,729,709 | 4/1973 | Augris et al. | 340/169 |
| 3,944,903 | 3/1976 | Clegg | 318/562 X |
| 4,053,818 | 10/1977 | Younkin | 318/562 |

Primary Examiner—B. Dobeck
Attorney, Agent, or Firm—Joseph E. Rusz; George Fine

[57] ABSTRACT

A system is provided for multistation remote position indication for remotely controlling and indicating the position of a motor driven positioning system, particularly an antenna rotor, at multiple locations utilizing a single pair of control wires to interconnect all remote control units. The system includes the generation of a symmetrical alternating polarity low frequency pulse train which is amplitude modulated by the position of the antenna, display of the antenna position by means of a polarity selective peak detecting voltmeter, and control of the antenna position by means of polarity selective current means through a synchronous detector and antenna drive motor control means.

2 Claims, 3 Drawing Figures

SYSTEM FOR MULTISTATION REMOTE POSITION INDICATION AND CONTROL

STATEMENT OF GOVERNMENT INTEREST

The invention described herein may be manufactured and used by or for the Government for governmental purposes without the payment of any royalty thereon.

BACKGROUND OF THE INVENTION

In the prior art, there existed the problem of limiting antenna position control and indication to one station of a multistation receiving location where all stations must utilize the same antenna system. A further problem also existed of relocating a receiving set via an extension transmission line or relocating a receiving set to another location where another receiving signal outlet is available and then returning to the former location every time it is necessary to reposition the receiving antenna. The system of the present invention solves the aforementioned problems. It uses a single pair of wires to carry both the antenna position indication signal as well as a bidirectional control signal. It also has the ability to parallel an unlimited number of remote control units on a single control circuit. It further utilizes the RF transmission lines to multiple receiving sets to simultaneously carry the antenna position indicating and position control signal.

The invention may be used for application where multiple receiving sites must alternately utilize the same receiving antenna. At locations where multiple receiving stations are already established, the multistation control system may be easily implemented since the existing RF transmission lines may be utilized to carry the position indicating and control signal. The antenna rotor control and position sensing means utilized are designed to work with most existing antenna rotors without modifications.

SUMMARY OF THE INVENTION

A system for multistation remote position indication and control utilizes a single pair of control wires to interconnect all remote control units. The system remotely controls and indicates the position of a motor driven positioning system such as an antenna rotor at multiple locations. The system generates a symmetrical alternating polarity low frequency pulse train which is modulated by the position of the antenna rotor. There is displayed the antenna position by means of a polarity selective peak detecting voltmeter. There is also control of the antenna position by means of polarity selective current means through a synchronous detector and antenna drive motor control means. The multistation remote control system is implemented by means of a Zener diode dual polarity pulse generator, a resistance type position sensor, two constant peak current sources, a polarity selector and rotation control switch, a polarized voltmeter, a polarized resistor, two synchronous detector relay drivers, and an antenna drive motor switching circuit. There may be also utilized an RF transmission line to the multiple receiving sets to simultaneously carry the remote position indicating and control signal.

DETAILED DESCRIPTION OF THE PREFERRED EMBODIMENTS

Figure 1:
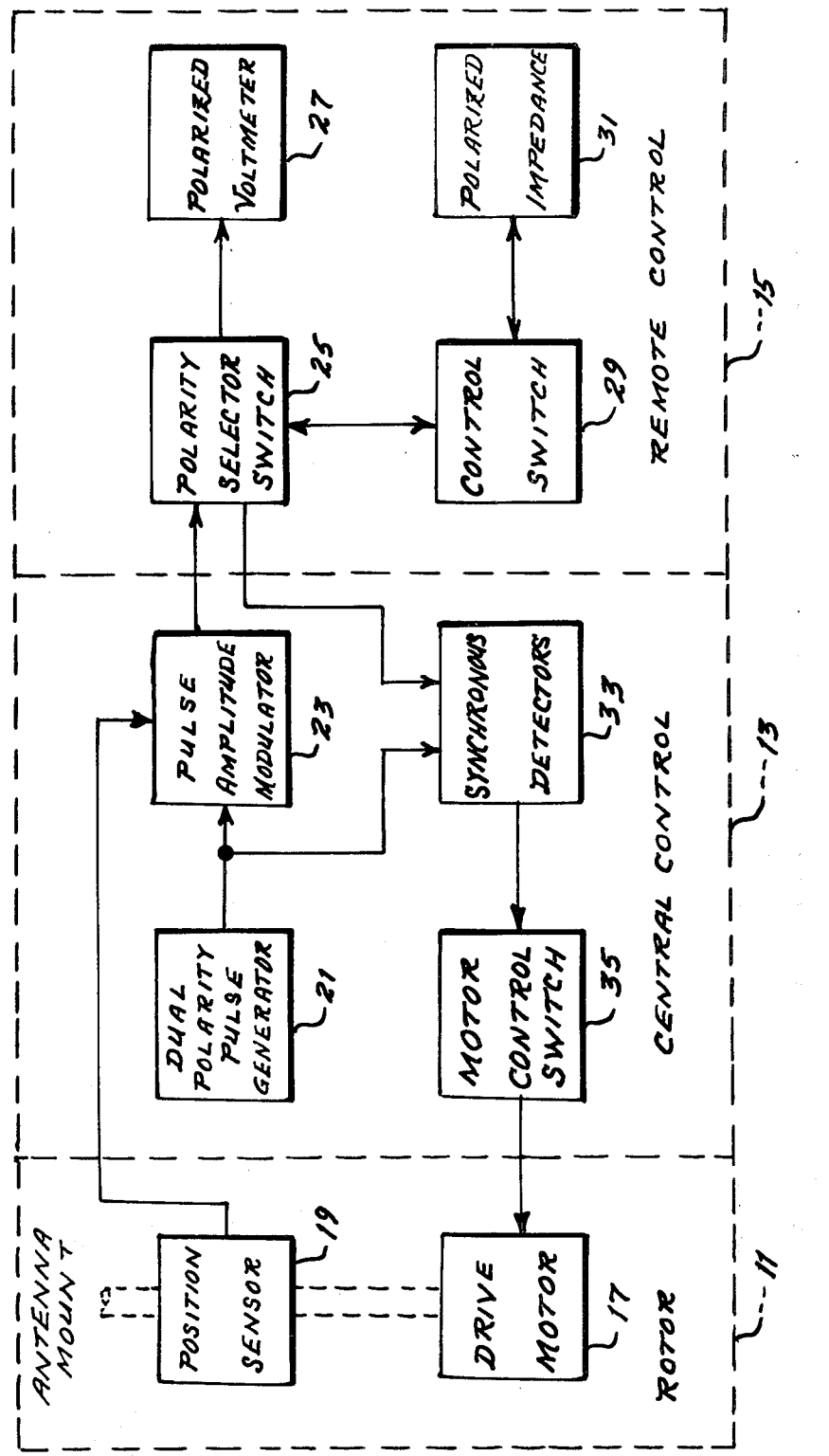
FIG. 1 shows in block diagram form the basic system for multistation remote position indication and control.

FIG. 1 depicts the basic system necessary to practice the invention. The multistation remote position indicating and control system is comprised of a minimum of three basic units: a rotor unit 11, a central control unit 13, and at least one remote control unit 15. There may be a multiplicity of such remote control units in a multistation control system. The rotor unit 11 on which an antenna would be mounted is comprised of a drive motor system 17, and an antenna direction position sensor 19. The central control unit 13 generates a symmetrical alternating polarity pulse train by means of dual polarity pulse train by means of dual polarity pulse generator 21. The pulse train is amplitude modulated in pulse amplitude modulator 23 according to the antenna position reported by position sensor 19. The pulse amplitude modulated signal is received in remote control unit 15 by polarity selector switch 25 which selects either the positive or negative polarity pulse to be indicated on polarized voltmeter 27, and selects the opposing polarity pulse for control switch 29 which selectively places polarized impedance element 31 across the circuit from the polarity selector switch 25 as desired to command rotation of the antenna. When the polarized impedance element is placed across the line to the remote unit, a polarized current pulse train significantly larger in magnitude than that generated by the polarized voltmeter is detected by synchronous detectors 33, which drive motor control switch 35 to rotate the antenna via antenna rotor drive motor 17. The polarity of the current pulse train detected by the synchronous detectors 33 determines the direction of antenna rotation that is commanded.

Figure 2:
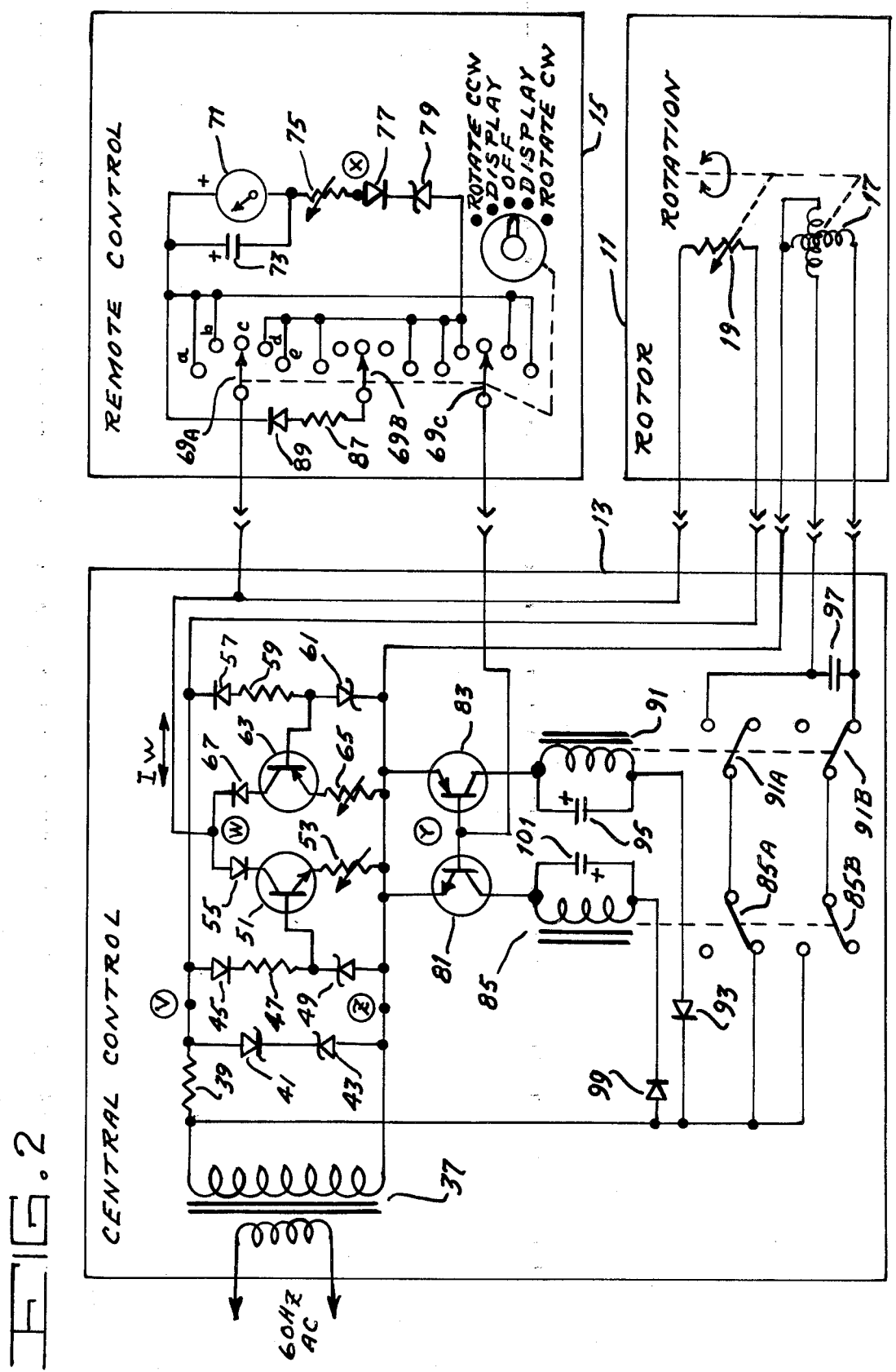
FIG. 2 shows the system of FIG. 1 in more detailed form.

FIG. 2 depicts the system in more detailed form. Transformer 37, current limiting resistor 39 and equal voltage rated Zener diodes 41 and 43 generate a symmetrical low voltage dual polarity pulse train. For clarity of explanation assume the convention that pulses that are positive a point v with rtespect to point z are termed positive pulses and that they occur during the phase of the pulse train termed the positive pulse phase. diode 45 selects positive pulses and through current limiting resistor 47 and Zener diode 49, establishes a constant peak voltage at the base of transistor 51 with respect to point z. Since the base to emitter voltage of a transistor in conduction is relatively constant, the peak voltage across resistor 53 will be constant. Transistor 51 is selected to be a relatively high gain transistor; therefore in a common emitter configuration, the base current will contribute negligably to the emitter current. The peak collector current will therefore be equal to the constant peak voltage across resistor 53 divided by the resistance of resistor 53. Thus a constant peak level current pulse will be created through diode 55 during the positive pulse phase. Diode 57, resistor 59, Zener diode 61, transistor 63, and resistor 65 create a similar constant peak level current pulse through diode 67 during the negative pulse phase.

As the antenna is rotated by rotor unit 11, position sensing resistor 19 varies resistance in direct proportion to the rotation angle from north or some other reference direction. The loading effects of the remote control unit 15 will later be shown to be negligible, so therefore the constant peak level current pulses flowing in and out of junction point w must flow through resistor 19. The peak voltage at point w with respect to point z will then be $Vwz = Vvz - Iw R19$ where Vwz is the peak voltage between points w and z, Iw is the peak current pulse through junction point w, and R19 is the resistance of resistor 19. The voltage Vwz will then have a peak voltage level proportional to the resistance of resistor 19 plus a constant offset.

The remote control unit is connected between points w and y. Although only one remote control unit is shown here, a multiplicity of such units could be paralleled directly and each unit would operate as described for the single unit depicted in FIG. 2. A three pole, five position switch 69, comprised of segments 69A, 69B, and 69C combines the functions of polarity selector and rotation control depicted in FIG. 1. Switch 69 is a spring return to center, c position, switch. When the switch is rotated to position b, a polarized voltmeter comprised of sensitive current meter 71, capacitor 73, variable resistor 75, diode 77, and Zener diode 79 is connected across central control unit points w and y by action of switch segments 69A and 69C. Since point y is at the juncture of the bases of complementary transistors 81 and 83, the voltage between points y and z will be a constant for either polarity current flowing into junction point y and will be equal to the base to emitter voltage for the transistors. With switch 69 in position b, the voltage at point x will have a positive peak level equal to the foreward conduction voltage of diode 77, plus the breakdown voltage of Zener diode 79, plus the base to emitter junction voltage of transistor 81. The voltmeter comprised of resistor 75, current meter 71, and capacitor 73 will indicate the peak voltage level between point w and point x, which represents a constant offset voltage. Since the voltage between points w and z is proportional to the rotation angle of the antenna plus a constant offset, the voltmeter may be calibrated to directly and linearly display the rotation angle of the antenna by suitable adjustment of resistors 53 and 75. A sensitive meter should be used in the voltmeter circuit so that the full deflection meter current will be negligibly small compared to the peak current at junction point w, and therefore the loading effect of the voltmeter circuit will be negligible.

The full deflection meter current must also be selected to be below the threshold base current through transistor 81 which will cause sufficient collector current to flow to pull in relay 85. With switch 69 rotated into position a, the voltmeter circuit will continue to display the antenna rotation angle by sensing the peak positive pulse level. Switch segment 69B will now cause a polarized resistor comprised of resistor 87 and diode 89 to be placed across the central control unit at points w and y. Diode 89 will now allow a sizable amount of current, which is limited by resistor 87, to flow through the base of transistor 83 during the negative pulse phase. Diode 93 permits current to flow into transistor 83 collector circuit only during the negative pulse phase thus diode 93, transistor 83, and relay 91 form a negative pulse phase synchronous current detector. Capacitor 95 smooths out the pulsed current through relay 91 to prevent relay chatter. The pulsed collector current pulls in relay 91 which, through relay contacts 91A, supplies AC current to the rotor motor directly and through phase shift capacitor 97 indirectly to cause the motor to rotate the antenna through geared speed reducing means not shown, in the counterclockwise direction. When switch 69 is returned to either positions b or c, rotation of the antenna will cease.

If switch 69 is rotated to position d, the polarity sensing of the voltmeter circuit is reversed from that in position b, and the voltmeter will display antenna position by indicating the negative peak voltage level from points w to y. Rotating switch 69 further to position e, the polarized resistor will be placed across points w to y in opposite polarity to that accomplished in switch position a, thus allowing a current pulse train to flow during the positive pulse phases. This current pulse train will cause significant base current to flow through transistor 81 during the positive pulse phases. Diode 99 permits collector current to flow in transistor 81 collector circuit only during the positive pulse phases, therefore the positive phase pulsed base current will synchronously generate pulsed collector current causing relay 85 to pull in. Capacitor 101 smooths the pulsed relay current to prevent relay chatter. As the relay operates, relay contacts 85B pass AC current to antenna drive motor 17 directly and through phase shift capacitor 97 indirectly to cause the motor to rotate the antenna in the clockwise direction. When switch 69 is returned to either position d or c, rotation of the antenna will cease.

Switch 69 is spring loaded to return to the center, c, position, therefore unless manually activated, the remote control unit will present an extremely large impedance across its input terminals. This allows a virtually unlimited number of remote control units to be directly paralleled. Any of the remote control units so parallel connected may read the position of the antenna and may command rotation of the rotor to reposition the antenna. If any two such units should simultaneously read out antenna position on the same phase, the double loading effect would still have a negligible effect on indication accuracy. If both units simultaneously command rotation of the antenna in the same direction, the increased base drive current would not be harmful. If both units simultaneously commanded rotation in opposite directions, the position indicating voltmeters would indicate this state by reverting to zero deflection. Relay contacts 85A and 91B would prevent antenna rotation in such a case and thus prevent damage to the drive motor.

Certain voltage relationships must be maintained within the system to assure proper operation and accurate position indication. Zener diodes 41 and 43 should be well matched in their voltage breakdown characteristics to assure equal position indication on either phase at or near full meter deflection operating points. Resistor R19 value as well as the peak current pulse level should be selected to assure that the minimum peak voltage level Vwz is approximately half of the Vwz peak voltage level and above the Zener diode 49 and 61 breakover voltage levels which should be approximately equal. Zener diode 79 should be selected to be below the minimum peak Vwz voltage level so that the constant peak voltage level at point x for either polarity pulse reading is always less than the minimum peak Vwz voltage. This will cause a minimum current to flow through meter 71 even when the antenna is rotated to its limit which causes maximum R19 resistance and therefore minimum meter deflection. This must be done to retain linearity in the display circuitry since the diode and transistor foreward biased junctions will demonstrate nonlinearities in their current to voltage transfer curves below a minimum current level. Resistor 75 is adjusted for full meter deflection when switch 69 is in position b and resistor 19 is at minimum resistance rotation position. The antenna must then be rotated so that resistor 19 is at maximum resistance rotation position, and resistor 53 adjusted to the minimum deflection point on meter 71. Switch 69 must then be rotated to position d, and resistor 65 adjusted to set the same minimum deflection point on meter 71. The position indicating meter 71 will now accurately display the rotation angle linearly between the minimum and maximum meter deflection points for either polarity position indicating pulses.

Figure 3:
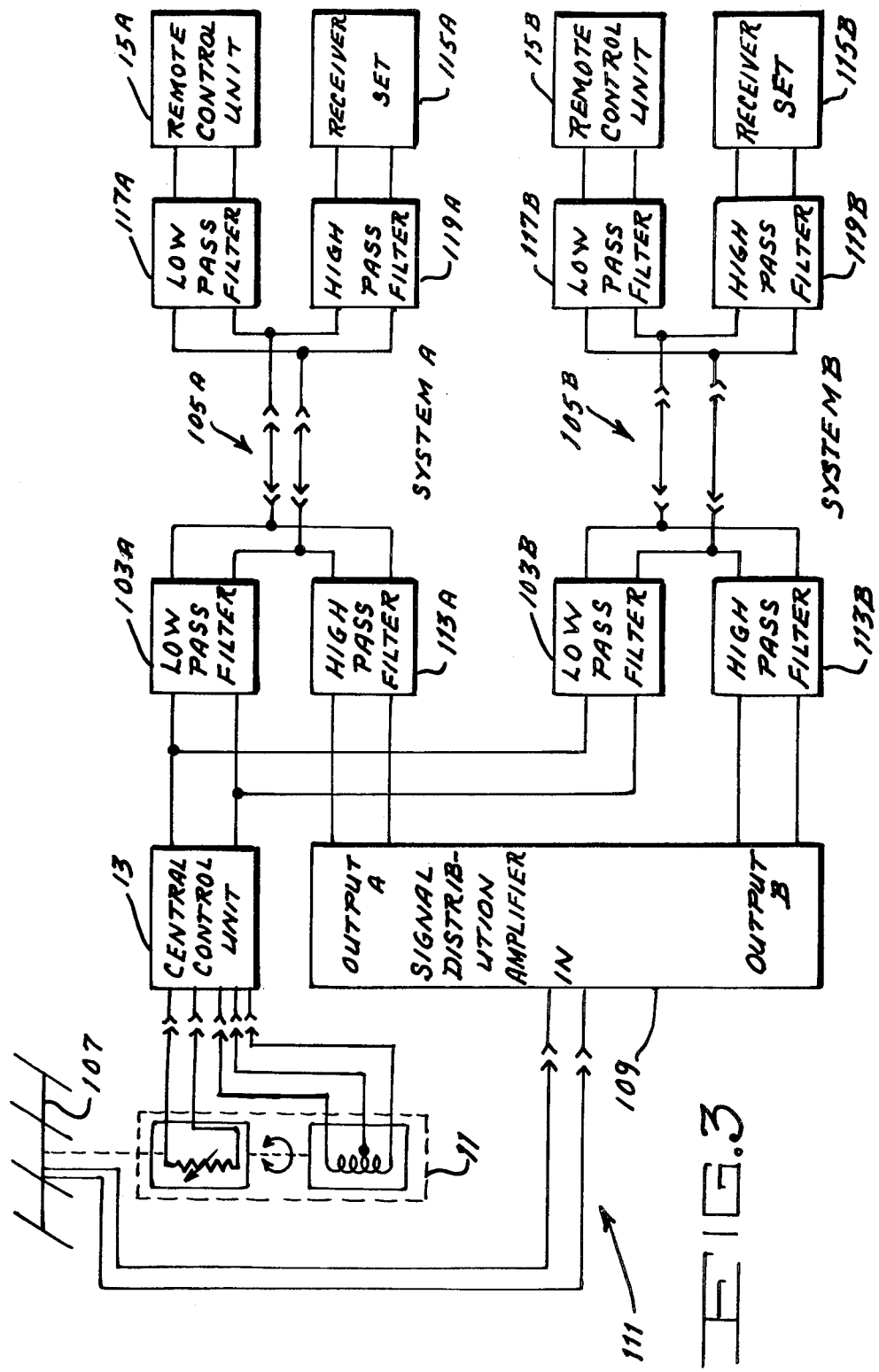
FIG. 3 shows a system for superimposing upon an RF transmission line from antenna to receiving set the control and display signal.

Since the multistation remote position indication and control system requires only two wires to each remote control unit, and the basic 60Hz frequency of the control and display signal is significantly below the RF frequency of most communication systems; the control and display signal may be superimposed upon the RF transmission line from antenna to receiving set by means of suitable low pass and high pass filters. FIG. 3 depicts such a system. Rotor unit 11 and central control unit 13 generate the low frequency dual polarity control and display signal which is passed through low pass filters 103A and 103B to transmission lines 105A and 105B. The RF signal from receiving antenna 107 is applied to distribution amplifier 109 through transmission line 111. The two outputs of the distribution amplifier drive transmission lines 105A and 105B through high pass filters 113A and 113B. At the locations of the receiving sets 115A and 115B, low pass filters 117A and 117B separate the control and display signal to remote control units 15A and 15B, and high pass filters 119A and 119B pass the high frequency receiver input RF signal and block the low frequency control and display signal to receiver sets 115A and 115B. FIG. 3 demonstrates a multistation transmission line carrier system for two receiving sets and two associated remote antenna position indicating and control units, however, the concept may be expanded to include a greater multiplicity of such parallel systems.

What is claimed is:

1. A system for multistation remote position indication and control comprised of a position sensor connected to a rotatable antenna mount for movement of an associated antenna, a drive motor connected to said position sensor, control means including a generator of symmetrical alternating polarity pulse train, pulse amplitude modulator means included in said control means, said pulse train being amplitude modulated in said modulator means according to the output of said position sensor, a remote sensor including a polarity selector switch having an input and selecting either the positive or negative pulse and also selects the opposing polarity pulse from the amplitude modulated pulse train, a polarized voltmeter receiving said positive or negative pulse for indication thereupon, a polarized impedance in said remote sensor, a control switch in said remote sensor receiving said opposing polarity pulse for selectively placing said polarized impedance across said input of said polarity selector switch to command the rotation of the associated antenna, a synchronous detector in said control means receiving said symmetrical alternating polarity pulse train and a polarized current pulse train significantly larger in magnitude than that generated by said polarized voltmeter, a motor control switch in said control means driven by said synchronous detector to rotate said associated antenna by rotation of said drive motor, the polarity of the current pulse train detected by said synchronous detector determining the direction of commanded rotation.

2. A system for superimposing a control and display signal upon an RF transmission line being comprised of an antenna, rotor means for said antenna, means generating low frequency dual polarity control and display signals being connected to said rotor means, first and second low pass filters each having an output and passing said dual polarity control and display signals, first and second transmission lines receiving signals from said first and second low pass filters, respectively, a signal distribution amplifier receiving an RF signal from said antenna and having first and second output signals, first and second high pass filters receiving first and second output signals from said signal distribution amplifier, first and second high pass filters, third and fourth transmission lines receiving, respectively, said first and second output signals by way of said first and second high pass filters, third and fourth low pass filters, third and fourth high pass filters, first and second remote control means, said third and fourth low pass filter receiving signals from said first and second transmission lines, respectively, for separation of signals for passage to said first and second control means, respectively, first and second receivers, receiving signals from said third and fourth high pass filters, respectively, for passage of said RF signal and blockage of the low frequency control and display signal.

* * * * *